US012630177B2

(12) United States Patent  (10) Patent No.: US 12,630,177 B2
Park et al.  (45) Date of Patent: May 19, 2026

(54) AUTONOMOUS DRIVING CONTROL APPARATUS AND METHOD THEREOF

(71) Applicants:Hyundai Motor Company, Seoul (KR); Kia Corporation, Seoul (KR)

(72) Inventors: Chi Hong Park, Seoul (KR); In Ho Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 165 days.

(21) Appl. No.: 18/419,054

(22) Filed: Jan. 22, 2024

(65) Prior Publication Data

US 2025/0145173 A1 May 8, 2025

(30) Foreign Application Priority Data

Nov. 6, 2023 (KR) ........................ 10-2023-0152001

(51) Int. Cl.
B60W 60/00 (2020.01)
B60W 30/18 (2012.01)
(Continued)

(52) U.S. Cl.
CPC .... B60W 60/001 (2020.02); B60W 30/18009 (2013.01); B60W 50/14 (2013.01);
(Continued)

(58) Field of Classification Search
CPC ......... B60W 60/001; B60W 30/18009; B60W 50/14; B60W 2420/403; B60W 2520/04;
(Continued)

(56) References Cited

U.S. PATENT DOCUMENTS 11,383,720 B2 * 7/2022 Im .......................... H04W 4/44
11,498,584 B2 * 11/2022 Oyama ........... B60W 30/18154
(Continued)

FOREIGN PATENT DOCUMENTS

GB 2571149 A * 8/2019 ...... B60W 30/18145
JP 2023-527599 A 6/2023
(Continued)

OTHER PUBLICATIONS

Machine translation KR 20170087647 downloaded from IP.com Aug. 15, 2025 (Year: 2025).*
(Continued)

*Primary Examiner* — Kito R Robinson
*Assistant Examiner* — Tanya C Sienko
(74) *Attorney, Agent, or Firm* — Banner & Witcoff, Ltd.

(57) ABSTRACT

Disclosed is an autonomous driving control apparatus which includes a sensor device, a driving device, a memory, and a controller. The autonomous driving control apparatus identifies traffic lights in front of a host vehicle, performs stop control for the host vehicle using the driving device, based on identifying that a lighting state of the traffic lights is a first lighting state, identifies that the lighting state of the traffic lights changes from the first lighting state to a second lighting state using the sensor device, and determines whether to perform restart control of the host vehicle based on at least one of whether a user keeps his or her eyes on the road, properties of a driving section, whether a pedestrian crosses, or whether a user confirmation input is received, or any combination thereof.

20 Claims, 9 Drawing Sheets

(51) Int. Cl.

| | |
|---|---|
| *B60W 50/14* | (2020.01) |
| *G06V 20/58* | (2022.01) |
| *G06V 20/59* | (2022.01) |
| *G06V 40/10* | (2022.01) |

(52) U.S. Cl.
CPC .......... *G06V 20/584* (2022.01); *G06V 20/597* (2022.01); *G06V 40/10* (2022.01); *B60W 2420/403* (2013.01); *B60W 2520/04* (2013.01); *B60W 2540/225* (2020.02); *B60W 2554/4029* (2020.02); *B60W 2555/60* (2020.02)

(58) Field of Classification Search
CPC ... B60W 2540/225; B60W 2554/4029; B60W 2555/60; B60W 30/181; B60W 30/18154; G06V 20/584; G06V 20/597; G06V 40/10
See application file for complete search history.

(56) References Cited

U.S. PATENT DOCUMENTS

| | | | |
|---|---|---|---|
| 2010/0033333 A1* | 2/2010 | Victor .................. | A61B 5/7264 340/576 |
| 2020/0183383 A1* | 6/2020 | Stent .................... | G05D 1/0061 |
| 2021/0078408 A1* | 3/2021 | Cordell .................. | G06V 20/56 |
| 2021/0287546 A1* | 9/2021 | Englander .............. | G08G 1/166 |
| 2022/0194421 A1* | 6/2022 | Ide .................... | B60W 60/0017 |
| 2022/0204042 A1* | 6/2022 | Mackenzie ....... | B60W 60/0051 |
| 2023/0182759 A1* | 6/2023 | Wright .................. | G07C 5/008 701/24 |
| 2023/0202525 A1* | 6/2023 | Wu .................. | B60W 30/0956 701/23 |
| 2023/0227058 A1* | 7/2023 | Julian .................... | G08G 1/164 340/439 |
| 2025/0244129 A1* | 7/2025 | Mallela .......... | B60W 30/18159 |

FOREIGN PATENT DOCUMENTS

| | | | | |
|---|---|---|---|---|
| KR | 20170087647 A | * | 7/2017 | ........ G06K 9/00818 |
| KR | 20210115491 A | * | 9/2021 | .......... B60W 30/181 |
| KR | 10-2023-0120686 A | | 8/2023 | |

OTHER PUBLICATIONS

Machine translation KR 20210115491 downloaded from IP.com Aug. 17, 2025 (Year: 2025).*

Evaluation of Multimodal and Multi-Staged Alerting Strategies for Forward Collision Warning Systems Jun Ma, Jiateng Li and Honwei Huang. Sensors 2022, 22, 1189. (Year: 2022).*

Design and Development of Traffic Light Recognition method for Autonomous vehicles using V2! Communication V.H. Prasad Reddy et al., 2023 3rd International conference on Artificial Intelligence and Signal Processing (Mar. 18-20, 2023.) (Year: 2023).*

Safety Concept for Autonomous Vehicles that Operate in Pedestrian Areas M. Kocsis et al., Proceedings of the 2017 IEEE/SICE International Symposium on System Integration, Taipei, Taiwan, Dec. 11-14, 2017 (Year: 2017).*

"Human-Centered Design for an In-Vehicle Truck Drier Fatigue and Distraction Warning System" T. Horberry et al; IEEE Transactions on Intelligent Transportation Systems, vol. 23, No. 6, Jun. 2022 (Year: 2022).*

E Autonomous Level 3: The Level of Driving Automation from https://caradas.com Sep. 21, 2023. (Year: 2023).*

"ZKW Use Case Autonomous Driving—Superimposing Dynamic Zebra Crossings" Oct. 19, 2017. YouTube video 25 seconds long. https://youtu.be/1pK716yv3QU?si=DHo1ADWY-W_9jHip (Year: 2017).*

* cited by examiner

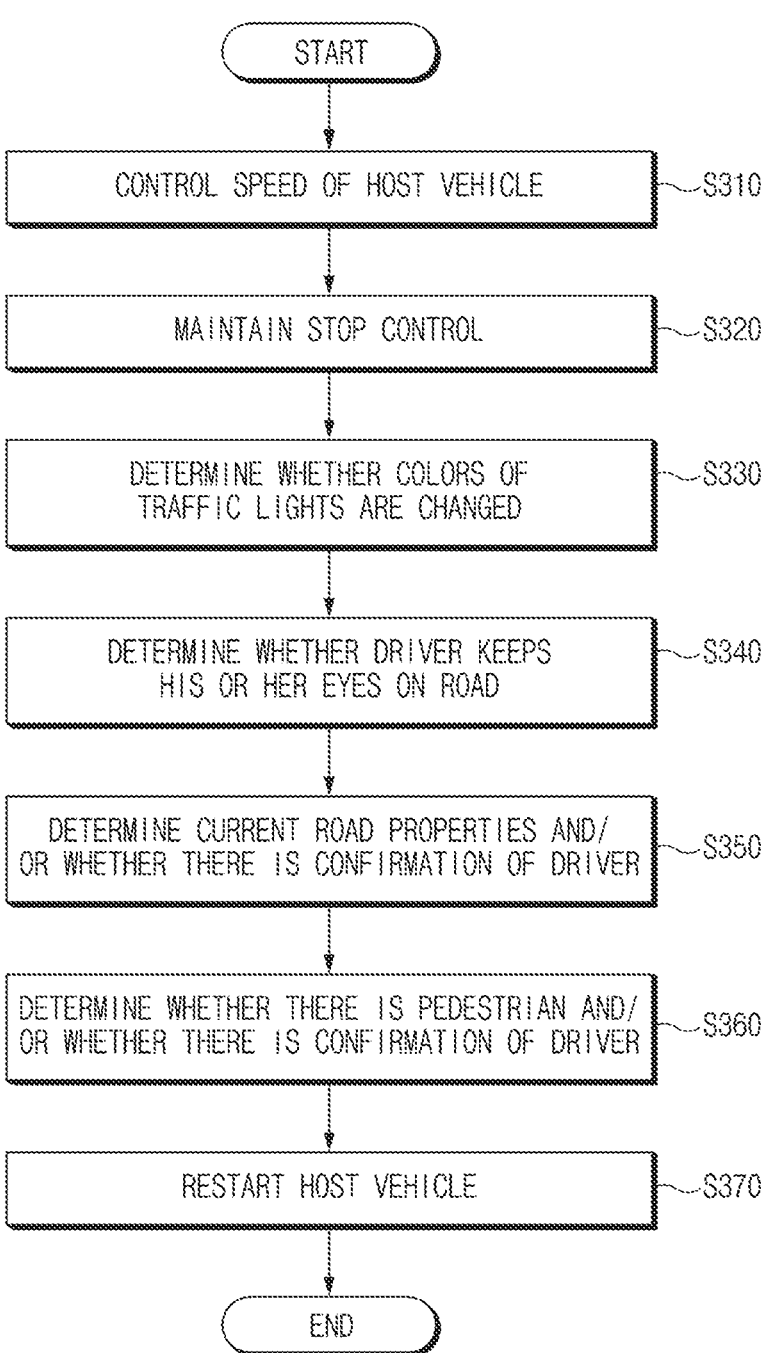

START

CONTROL SPEED OF HOST VEHICLE ~S310

MAINTAIN STOP CONTROL ~S320

DETERMINE WHETHER COLORS OF TRAFFIC LIGHTS ARE CHANGED ~S330

DETERMINE WHETHER DRIVER KEEPS HIS OR HER EYES ON ROAD ~S340

DETERMINE CURRENT ROAD PROPERTIES AND/ OR WHETHER THERE IS CONFIRMATION OF DRIVER ~S350

DETERMINE WHETHER THERE IS PEDESTRIAN AND/ OR WHETHER THERE IS CONFIRMATION OF DRIVER ~S360

RESTART HOST VEHICLE ~S370

END

FIG.3

AUTONOMOUS DRIVING CONTROL APPARATUS AND METHOD THEREOF

CROSS-REFERENCE TO RELATED APPLICATION

This application claims the benefit of priority to Korean Patent Application No. 10-2023-0152001, filed in the Korean Intellectual Property Office on Nov. 6, 2023, the entire contents of which are incorporated herein by reference.

TECHNICAL FIELD

The present disclosure relates to an autonomous driving control apparatus and a method thereof, and more particularly, relates to technologies of adaptively performing stop control and driving control for a host vehicle.

BACKGROUND

As vehicles providing driver assisting functions have been gradually spread, various technologies about autonomous driving have been developed. The autonomous driving may be divided into partial autonomous driving, conditional autonomous driving, high autonomous driving, and/or full autonomous driving depending on its control level.

Meanwhile, various types of control algorithms (or functions) for controlling driving of a host among autonomous driving control functions have been developed.

As an example, the autonomous driving control apparatus may perform a function of stopping or restarting the host vehicle based on the identification result of external objects (e.g., pedestrians, other vehicles, and/or obstacles) present in front of the host vehicle.

Meanwhile, when there is a traffic light in front of the host vehicle, the vehicle must be controlled to stop if the red light is on as a result of identifying the lighting status of the traffic light. At this time, while continuously identifying the lighting status of the traffic light, if it is identified that the green light is on and the red light is off, it can be identified as a situation in which the host vehicle must be restarted. In this situation, if the autonomous driving control device simply restarts the host vehicle based on solely on the lighting status of the traffic light without considering other external factors (e.g., when a pedestrian fails to cross the crosswalk, the properties and/or zone information of the host vehicle's driving section, or whether the driver is looking ahead), it may cause the driver to feel uncomfortable or create a dangerous situation.

SUMMARY

The following summary presents a simplified summary of certain features. The summary is not an extensive overview and is not intended to identify key or critical elements.

An aspect of the present disclosure provides an autonomous driving control apparatus for identifying information about traffic lights (e.g., lighting state of the traffic lights) present in front of a host vehicle, using the sensor device, and performing autonomous driving control to stop or restart the host vehicle based on the lighting state of the traffic lights.

Another aspect of the present disclosure provides an autonomous driving control apparatus for determining whether to restart the host vehicle, if the lighting state of the traffic light is changed to an lighting state indicating that the host vehicle is ready to start while controlling the vehicle to stop, based on at least one of whether the driver is looking ahead, the attributes of the driving section, whether pedestrians are crossing, whether the driver confirmation input is received, or any combination thereof.

The technical problems to be solved by the present disclosure are not limited to the aforementioned problems, and any other technical problems not mentioned herein will be clearly understood from the following description by those skilled in the art to which the present disclosure pertains.

An apparatus may comprise: a sensor device; a driving device; a memory storing at least one instruction; and a controller operatively connected with the sensor device and the memory, wherein the at least one instruction is configured to, when executed by the controller, cause the apparatus to: identify, using the sensor device, a stop indicator in front of a vehicle; control, based on a status of the stop indicator, the driving device to stop the vehicle; identify, using the sensor device and while the vehicle is stopped, a condition to control the driving device to restart the vehicle, wherein the condition comprises a change of the status of the stop indicator; and determine, based on the condition, whether to control the driving device to restart the vehicle based on at least one of: a tracking status of eyes of a user of the vehicle, properties of a driving section associated with presence of a pedestrian in proximity to the vehicle, or a user confirmation input for accelerating the vehicle.

The sensor device may comprise a front view camera and an in-cabin camera (ICC), and wherein the at least one instruction is configured to, when executed by the controller, cause the apparatus to: identify, using the front view camera, a lighting state of traffic lights as at least part of the status of the stop indicator.

The apparatus may further comprise: an input device, wherein the at least one instruction is configured to, when executed by the controller, cause the apparatus to: identify whether the user confirmation input is received through the input device.

The apparatus may further comprise: a notification device, wherein the at least one instruction is configured to, when executed by the controller, cause the apparatus to: based on a detection that a lighting state of traffic lights changes to a second lighting state while controlling the driving device to stop the vehicle, output, to the user and using the notification device, information indicating the second lighting state of the traffic lights as at least part of the status of the stop indicator.

The at least one instruction may be configured to, when executed by the controller, cause the apparatus to: determine, using the sensor device, whether the user keeps the eyes on a road; based on a determination that the user does not keep the eyes on the road, output, to the user and using the notification device, a look-ahead notification comprising information that informs the user to keep the eyes on the road; and based on a determination that the user does not keep the eyes on the road within a first time from a time point when the look-ahead notification is output, output a look-ahead warning comprising a signal that causes the user to keep the eyes on the road.

The at least one instruction may be configured to, when executed by the controller, cause the apparatus to: output the look-ahead warning by activating a look-ahead warning operation, and wherein the look-ahead warning comprises at least one of: an activation of a hazard light, an audible warning sound, or a haptic feedback.

The at least one instruction may be configured to, when executed by the controller, cause the apparatus to: determine, using the sensor device, whether the user keeps the eyes on a road; identify the properties of the driving section; based on an identification that the driving section is not included in a specified zone using the identified properties determine, using the sensor device, whether there is a pedestrian in front of the vehicle; and based on a determination that there is no pedestrian in front of the vehicle, restart, using the driving device, the vehicle according to first acceleration intensity.

The at least one instruction may be configured to, when executed by the controller, cause the apparatus to: output, to the user, a pedestrian notification using the notification device; maintain, based on a determination that there is a pedestrian in front of the vehicle, the vehicle in a stopped state; based on a determination that a pedestrian is not identified within a second time from a time point when the pedestrian notification is output, output, to the user, a notification indicating the user confirmation input during a specified time; and based on receiving the user confirmation input within the specified time from the user, restart, using the driving device, the vehicle according to second acceleration intensity less than the first acceleration intensity.

The at least one instruction may be configured to, when executed by the controller, cause the apparatus to: activate, based on a failure of detecting the user confirmation input within the specified time, a warning operation to output a warning signal, wherein the warning signal comprises at least one of: an activation of a hazard light, an audible warning sound, or a haptic feedback; and deactivate autonomous driving control for the vehicle.

The at least one instruction may be configured to, when executed by the controller, cause the apparatus to: based an identification of one or more pedestrians in front of the vehicle within the second time from the time point when the pedestrian notification is output, deactivate autonomous driving control for the vehicle.

The at least one instruction may be configured to, when executed by the controller, cause the apparatus to: identify the pedestrian in front of the vehicle, and wherein the pedestrian is identified as being in front of the vehicle in an area which extends side-to-side beyond the stop line halting the vehicle.

The at least one instruction may be configured to, when executed by the controller, cause the apparatus to: based on a determination that the driving section is included in the specified zone using the identified properties, output, to the user, a plurality of notifications comprising: a first notification about the user confirmation input; and a second notification comprising information that indicates the driving section corresponds to the specified zone during the specified time; and based on receiving the user confirmation input within the specified time from the user, restart, using the driving device, the vehicle according to third acceleration intensity less than the second acceleration intensity.

The at least one instruction may be configured to, when executed by the controller, cause the apparatus to: activate, based on a failure of detecting the user confirmation input within the specified time, a warning operation to output a warning signal (e.g., a user confirmation warning, etc.), wherein the warning signal comprises at least one of: an activation of a hazard light, an audible warning sound as a look-ahead indication, or a haptic feedback; and deactivate autonomous driving control for the vehicle.

The apparatus may further comprise: a communication device, wherein the at least one instruction is configured to, when executed by the controller, cause the apparatus to: determine whether the status of the stop indicator changes by identifying a lighting state of traffic lights changes, using traffic light information received via the communication device.

The at least one instruction may be configured to, when executed by the controller, cause the apparatus to: based on receiving a resume request input of the autonomous driving control from the user after deactivating the autonomous driving control, reactivate the autonomous driving control.

A control method may comprise: identifying, by a controller and using a sensor device, a stop indicator in front of a vehicle, wherein the stop indicator comprises traffic lights; controlling, by the controller and based on a status of the stop indicator, a driving device to stop the vehicle, wherein the status of the stop indicator comprises a first lighting state as a lighting state of the traffic lights; identifying, by the controller and using the sensor device, that the lighting state of the traffic lights changes from the first lighting state to a second lighting state; and determining, by the controller, whether to control the driving device to restart the vehicle based on at least one of: a tracking status of eyes of a user of the vehicle, properties of a driving section associated with presence of a pedestrian in proximity to the vehicle, or a user confirmation input for accelerating the vehicle.

The method may further comprise: based on a detection of the lighting state of the traffic lights changes to the second lighting state while controlling the driving device to stop the vehicle, outputting, to the user and using a notification device, information indicating the lighting state of the traffic lights; determining, by the controller and using the sensor device, whether the user keeps the eyes on a road; based on a determination that the user does not keep the eyes on the road, outputting, by the controller and to the user, a look-ahead notification comprising information that informs the user to keep the eyes on the road; and based on a determination that the user does not keep the eyes on the road within a first time from a time point when the look-ahead notification is output, outputting a look-ahead warning comprising a signal that causes the user to keep the eyes on the road.

The method may further comprise: based on a determination that the user keeps the eyes on the road, identifying, by the controller, the properties of the driving section; based on an identification that the driving section is not included in a specified zone using the identified properties, determining, by the controller and using the sensor device, whether there is a pedestrian in front of the vehicle; and based on a determination that there is no pedestrian in front of the vehicle, restarting, by the controller and using the driving device, the vehicle according to first acceleration intensity.

The method may further comprise: outputting, by the controller and to the user, a pedestrian notification using the notification device; based on a determination that there is a pedestrian in front of the vehicle, maintaining, by the controller, the vehicle in a stopped state; based on a determination that a pedestrian is not identified within a second time from a time point when the pedestrian notification is output, outputting, by the controller and to the user, a notification indicating the user confirmation input during a specified time; and based on receiving the user confirmation input within the specified time from the user, restarting, by the controller and using the driving device, the vehicle according to second acceleration intensity less than the first acceleration intensity.

The method may further comprise: outputting, by the controller and to the user, a plurality of notifications comprising: a first notification about the user confirmation input;

and a second notification comprising information that indicates the driving section corresponds to the specified zone during the specified time; and based on receiving the user confirmation input within the specified time from the user, restarting, by the controller and using the driving device, the vehicle according to third acceleration intensity less than the second acceleration intensity.

These and other features and advantages are described in greater detail below.

BRIEF DESCRIPTION OF THE DRAWINGS

The above and other objects, features and advantages of the present disclosure will be more apparent from the following detailed description taken in conjunction with the accompanying drawings:

FIG. 3 is a flowchart of an autonomous driving control method;

Figure 1:
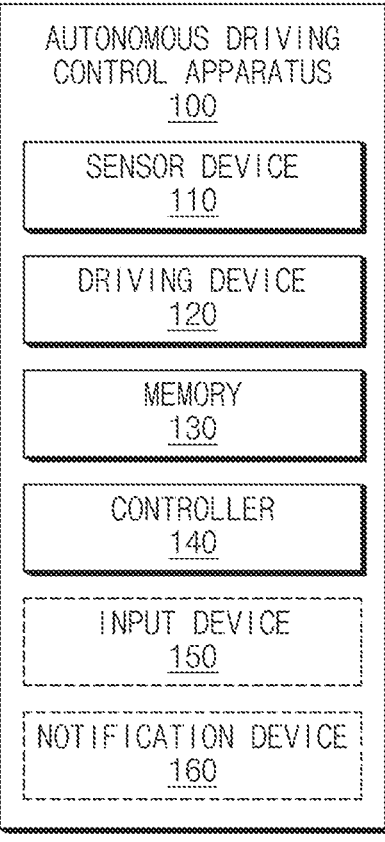
FIG. 1 is a block diagram illustrating components of an autonomous driving control apparatus.

With regard to description of drawings, the same or similar denotations may be used for the same or similar components.

DETAILED DESCRIPTION

Hereinafter, various examples of the present disclosure will be described in detail with reference to the exemplary drawings. In the drawings, the same reference numerals will be used throughout to designate the same or equivalent components. In addition, a detailed description of well-known features or functions may be omitted in order not to unnecessarily obscure the gist of the present disclosure.

In describing the components of the embodiment according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which this invention belongs. It will be understood that terms used herein should be interpreted as having a meaning that is consistent with their meaning in the context of this disclosure and the relevant art and will not be interpreted in an idealized or overly formal sense unless expressly so defined herein.

Hereinafter, examples of the present disclosure will be described in detail with reference to FIGS. 1 to 9.

FIG. 1 is a block diagram illustrating components of an autonomous driving control apparatus.

An autonomous driving control apparatus 100 may include at least one of a sensor device 110, a driving device 120, a memory 130, a controller 140, an input device 150, or a notification device 160, or any combination thereof. The components of the autonomous driving control apparatus 100, which are shown in FIG. 1, are illustrative, and aspects of the present disclosure are not limited thereto. For example, the autonomous driving control apparatus 100 may further include components (e.g., at least one of an interface, a communication device, or a display, or any combination thereof) which are not shown in FIG. 1.

The sensor device 110 may obtain (or identify) various pieces of information used for driving of a host vehicle.

For example, the sensor device 110 may include at least one sensor including at least one of a camera, radio detection and ranging (RADAR), or light detection and ranging (Li-DAR), an ultrasonic sensor, or any combination thereof.

For example, the sensor device 110 may include a front view camera and/or an in cabin camera (ICC).

As an example, the sensor device 110 may include the front view camera for identifying information about objects (e.g., at least one of traffic lights, a pedestrian, or another vehicle, or any combination thereof) included in an area in front of the host vehicle.

As an example, the sensor device 110 may include the ICC for identifying information about objects (e.g., at least one of a user (or a driver), a passenger, a load, or a seat, or any combination thereof) included in an interior area of the host vehicle.

The driving device 120 may include at least one device for driving and/or braking of the host vehicle.

For example, the driving device 120 may include at least one braking device (e.g., a brake) for braking the host vehicle.

For example, the driving device 120 may include at least one driving device (e.g., an actuator, an engine, or the like) for driving the host vehicle.

The memory 130 may store a command or data. For example, the memory 130 may store one or more instructions, when executed by the controller 140, causing the autonomous driving control apparatus 100 to perform various operations.

For example, the memory 130 and the controller 140 may be implemented as one chipset. The controller 140 may include at least one of a communication processor or a modem.

For example, the memory 130 may store various pieces of information associated with the autonomous driving control apparatus 100. As an example, the memory 130 may store information about an operation history of the controller 140. As an example, the memory 130 may store information about states and/or operations of components (e.g., at least one of an engine control unit (ECU), the sensor device 110, the driving device 120, the memory 130, the input device 150, or the notification device 160, or any combination thereof) of the host vehicle.

The controller 140 may be operatively connected with at least one of the sensor device 110, the driving device 120, the memory 130, the input device 150, or the notification device 160, or any combination thereof. For example, the controller 140 may control an operation of at least one of the sensor device 110, the driving device 120, the memory 130, the input device 150, or the notification device 160, or any combination thereof.

For example, the controller 140 may identify traffic lights in front of the host vehicle using the sensor device 110.

As an example, the controller 140 may identify information about traffic lights which are present in front of the host vehicle, using the front view camera included in the sensor device 110. The information about the traffic lights may include, for example, a lighting state of the traffic lights. The controller 140 may identify, for example, at least one light which is being turned on among a plurality of lights (e.g., a red light, a yellow light, and a green light) included in the traffic lights.

As an example, the controller 140 may identify that the lighting state of the traffic lights is a first lighting state, using the sensor device 110. The first lighting state may be, for example, a state in which the green light among the plurality of lights included in the traffic lights is being turned on. In other words, the first lighting state may be a lighting state of the traffic lights indicating that the vehicle is unable to pass through a crosswalk corresponding to the traffic lights. In this case, the controller 140 may perform stop control for the host vehicle. In other words, the controller 140 may stop the host vehicle using the driving device 120 before the host vehicle passes through the crosswalk corresponding to the traffic lights, based on identifying that the lighting state of the traffic lights which is present in front of the host vehicle is the first lighting state.

As an example, the controller 140 may identify that the lighting state of the traffic lights changes from the first lighting state to a second lighting state, using the sensor device 110. The second lighting state may be, for example, a state in which the green light among the plurality of lights included in the traffic lights is being turned on. In other words, the second lighting state may be a lighting state of the traffic lights indicating that the vehicle is able to pass through the crosswalk corresponding to the traffic lights. In other words, the controller 140 may restart (e.g., control a driving device to accelerate the vehicle) the host vehicle which is being stopped to pass the host vehicle through the crosswalk corresponding to the traffic lights, based on identifying that the lighting state of the traffic lights which are present in front of the host vehicle changes from the first lighting state to the second lighting state. An algorithm for restarting the host vehicle in the controller 140 may be referenced in detail by a described which will be described below. For example, the operation of restarting the host vehicle may refer to an operation in which the autonomous driving control apparatus 100 drives the host vehicle again depending on identifying that a driving state, a user state, or the like meets a specified condition while the host vehicle is stopping by stop control of the autonomous driving control apparatus 100.

For example, if it is identified that the lighting state of the traffic lights which are present in the front of the host vehicle changes from the first lighting state to the second lighting state, the controller 140 may determine whether to perform restart control of the host vehicle based on at least one of whether the user keeps his or her eyes on the road, properties of a driving section, whether a pedestrian crosses, or if a user confirmation input is received, or any combination thereof.

For example, if it is identified the lighting state of the traffic lights changes from the first lighting state to the second lighting state while performing the stop control, the controller 140 may provide the user with information about the lighting state of the traffic lights using the notification device 160. The information about the lighting state of the traffic lights may include at least one of, for example, information about the second lighting state or information indicating that the host vehicle is able to restart, or any combination thereof.

For example, the controller 140 may identify whether the user keeps his or her eyes on the road using the sensor device 110. For example, if it is identified that the user does not keep his or her eyes on the road, the controller 140 may provide the user with a look-ahead notification using the notification device 160. The look-ahead notification may include, for example, visual and/or audible contents including a notification that the user needs to look his or her eyes on the road to restart the host vehicle.

For example, if it is identified that the user does not keep his or her eyes on the road, the controller 140 may provide the user with the look-ahead notification using the notification device 160. If it is identified that the user does not keep his or her eyes on the road within a first time from a time point when the look-ahead notification is provided using the sensor device 110, the controller 140 may activate a look-ahead warning function including at least one of hazard light ON, a sound output function about look-ahead, or a haptic function, or any combination thereof using the notification device 160. The look-ahead warning function may include, for example, a function of activating hazard lights, activating the haptic function of applying vibration to a part of the user's body, and activating a sound notification of stronger intensity than the sound notification provided by means of the look-ahead notification. As an example, if it is identified that the user keeps his or her eyes on the road, the controller 140 may end (or turn off) the notification function which is being output.

For example, if it is identified that the user keeps his or her eyes on the road, the controller 140 may identify properties of a driving section in which the host vehicle is traveling. The properties of the driving section may include at least one of, for example, road information of the driving section or zone information (e.g., information about whether the driving section corresponds to a school zone), or any combination thereof.

As an example, if it is identified that the driving section is not included in a specified zone (e.g., the school zone, a construction zone, etc.) based on the identified properties, the controller 140 may identify whether there is a pedestrian in front of the host vehicle using the sensor device 110. For example, when the pedestrian is identified within an area with a wider width than the width of a line in which the host vehicle is stopping among areas in front of the host vehicle, the controller 140 may identify that there is the pedestrian. An example of identifying whether there is a pedestrian will be described in detail in a description of FIG. 7.

If it is identified that there is no pedestrian, for example, the controller 140 may restart the host vehicle using the driving device 120. At this time, the controller 140 may restart the host vehicle based on first acceleration intensity.

If it is identified that there is the pedestrian, for example, the controller 140 may provide the user with a pedestrian notification using the notification device 160 and may maintain stop control for the host vehicle using the driving device 120. The pedestrian notification may include at least one of, for example, motion information of the pedestrian which exists in front of the host vehicle or position information of the pedestrian, or any combination thereof. For example, if it is identified that the pedestrian is not identified within a second time from a time point when the pedestrian notification is provided, the controller 140 may provide the user with a notification (e.g., a pop-up notification) about a user confirmation input during a specified time. For another example, if the pedestrian is (e.g., continuously) identified during the second time from the time point when the pedestrian notification is provided, the controller 140 may end (or deactivate) autonomous driving control for the host vehicle. The controller 140 may maintain an autonomous driving control function in a standby state by deactivating the autonomous driving control for the host vehicle. For example, based on receiving a resume request input (e.g., a pedal input) of the autonomous driving control from the user after deactivating the autonomous driving control, the controller 140 may reactivate the autonomous driving control.

As an example, based on receiving the user confirmation input within the specified time by means of the pop-up notification from the user, the controller 140 may restart the host vehicle based on second acceleration intensity less than the first acceleration intensity using the driving device 120.

As an example, based on not receiving the user confirmation input within the specified time by means of the pop-up notification from the user, the controller 140 may activate a warning function including at least one of hazard light ON, a sound output function about look-ahead, or a haptic function, or any combination thereof and may end (or deactivate) autonomous driving control for the host vehicle. For example, based on receiving a resume request input (e.g., a pedal input) of the autonomous driving control from the user after deactivating the autonomous driving control, the controller 140 may reactivate the autonomous driving control.

As an example, based on identifying that the driving section is included in the specified zone (e.g., the school zone based on the identified properties, the controller 140 may provide the user with a first notification (e.g., a first pop-up notification) about the user confirmation input and a second notification (e.g., a second pop-up notification) including information that the driving section corresponds to the specified zone (e.g., the school zone) during the specified time using the notification device 160.

Based on receiving the user confirmation input from the user by means of the first notification within the specified time, the controller 140 may restart the host vehicle using the driving device 120. At this time, the controller 140 may restart the host vehicle based on third acceleration intensity. The third acceleration intensity may be intensity less than the second acceleration intensity. In some implementations, only when identifying that the user keeps his or her eyes on the road, the controller 140 may perform restart control of the host vehicle based on the third acceleration intensity.

As an example, based on not receiving the user confirmation input from the user within the specified time (e.g., by means of the first notification), the controller 140 may activate a warning function including at least one of hazard light ON, a sound output function about look-ahead, or a haptic function, or any combination thereof and may end (or deactivate) autonomous driving control for the host vehicle. For example, based on receiving a resume request input (e.g., a pedal input) of the autonomous driving control from the user after deactivating the autonomous driving control, the controller 140 may reactivate the autonomous driving control.

The components of autonomous driving control the apparatus 100, which are illustrated in FIG. 1, are illustrative, and aspects of the present disclosure are not limited thereto. For example, the autonomous driving control apparatus 100 may further include a communication device (not shown). The autonomous driving control apparatus 100 may perform vehicle-to-everything (V2X) communication using the communication device.

For example, the controller 140 may receive traffic light information from the outside (e.g., a server, at least one other vehicle, and/or traffic lights) through the communication device and may identify a lighting state of the traffic lights (e.g., whether the lighting state of the traffic lights changes) using the received traffic light information.

The input device 150 may include at least one input device (e.g., a button, a touch screen, an audio receiver, and/or a camera) configured to receive a user confirmation input from the user.

For example, the input device 150 may receive a user confirmation input (e.g., a pressure input, a touch input, a voice input, and/or a gesture input) to the at least one input device from the user. For example, if the user confirmation input to the input device 150 is received, the controller 140 may identify a user intention that the user agrees on the restart control of the host vehicle.

For example, the input device 150 may be provided in at least one area in the interior of the host vehicle. The input device 150 may be disposed in one area of at least one of, for example, a steering wheel or a pedal device, or any combination thereof.

The notification device 160 may include at least one display device, at least one haptic device, and/or at least one sound output device.

For example, the notification device 160 may provide the user with at least one of information about the lighting state of the traffic lights, the look-ahead notification, the pedestrian notification, the notification (e.g., the pop-up notification) about the user confirmation input, or the notification including the information that the driving section corresponds to the specified zone (e.g., the school zone), or any combination thereof by means of visual, audible, and/or tactile content.

For example, the notification device 160 may provide the user with a warning function (e.g., a look-ahead warning function) including a notification function of stronger intensity that the above-mentioned notifications.

Figure 2:
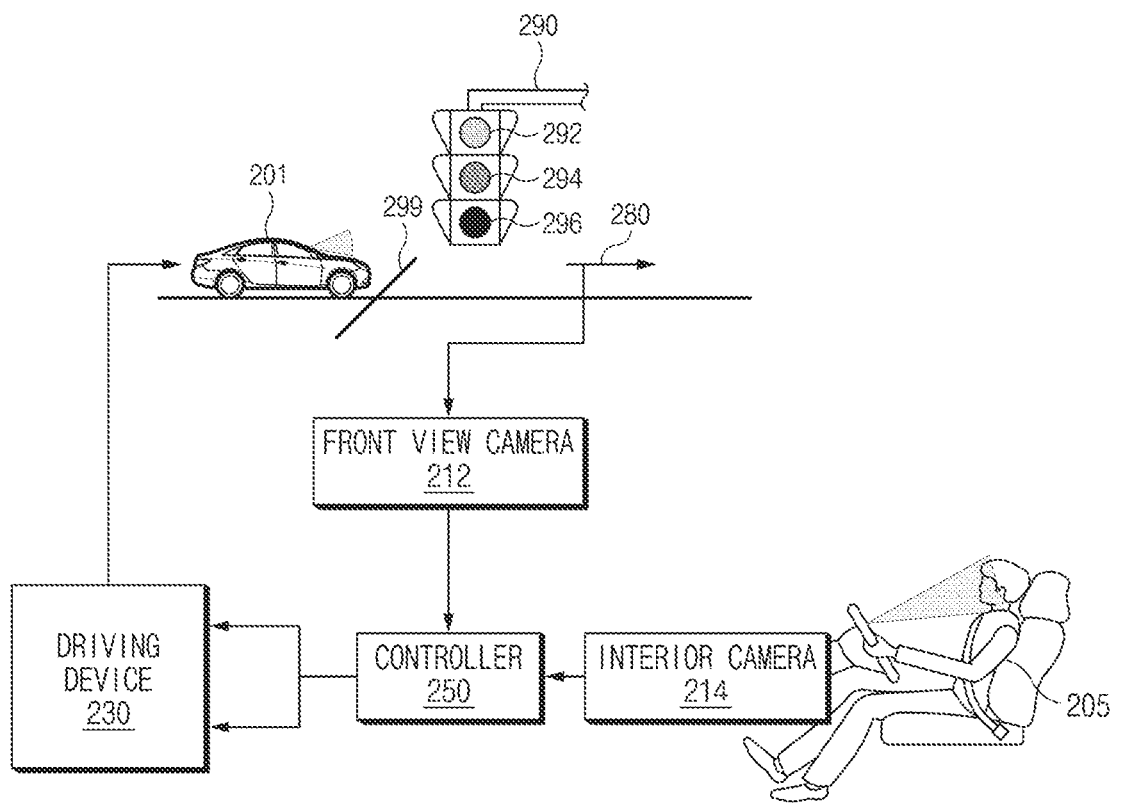
FIG. 2 is a conceptual diagram illustrating components and an operation of an autonomous driving control apparatus.

FIG. 2 is a conceptual diagram illustrating components and an operation of an autonomous driving control apparatus.

An autonomous driving control apparatus s (e.g., an autonomous driving control apparatus 100 of FIG. 1) corresponding to a host vehicle 201 may include at least one of a front view camera 212, an interior camera 214, a driving device 230 (e.g., a driving device 120 of FIG. 1), or a controller 250 (e.g., a controller 140 of FIG. 1), or any combination thereof. For example, the front view camera 212 and the interior camera 214 may be devices included in a sensor device (e.g., a sensor device 110 of FIG. 1). For example, the controller 250 may control at least one of the interior camera 214 or the driving device 230 (e.g., the driving device 120 of FIG. 1), or any combination thereof.

The structure of the components shown in FIG. 2 is illustrative, and aspects of the present disclosure are not limited thereto. For example, at least some (e.g., the front view camera 212 and the interior camera 214) of the components shown in FIG. 2 may be implemented as a part of the sensor device 110 of FIG. 1 or may be implemented together with the sensor device 110 as one chip. At least some of operations of at least some of components which will be described below may be performed by a controller 140 of FIG. 1 (or control of the controller 140).

For example, the controller 250 may control driving and braking of the host vehicle 201.

As an example, the controller 250 may drive (or restart) or brake the host vehicle 201 using at least one device included in the driving device 230.

For example, the controller 250 may identify pieces of information (e.g., a lighting state) about traffic lights 290 which are present in front of the host vehicle 201, using the front view camera 212.

As an example, the controller 250 may identify a light which is being turned on among a plurality of lights (e.g., a first light 292, a second light 294, and a third light 296) included in the traffic lights 290.

As an example, based on identifying that the first light (e.g., the green light) 292 among the plurality of lights included in the traffic lights 290 is being turned on, the controller 250 may identify that the lighting state of the traffic lights 290 corresponds to a first lighting state.

As an example, the controller 250 may stop the host vehicle 201 using the driving device 230, based on identifying that the lighting state of the traffic lights 290 is the first lighting state. For example, the controller 250 may stop the host vehicle 201 at a stop line 299, thus performing stop control such that the host vehicle 201 does not pass through a crosswalk corresponding to the traffic lights 290.

As an example, based on identifying that the third light (e.g., the green light) 296 among the plurality of lights included in the traffic lights 290 is being turned on, the controller 250 may identify that the lighting state of the traffic lights 290 corresponds to a second lighting state.

As an example, the controller 250 may restart the host vehicle 201 using the driving device 230, based on identifying that the lighting state of the traffic lights 290 changes from the first lighting state to the second lighting state. For example, after stopping the host vehicle 201 at the stop line 299 based on identifying the first lighting state, based on identifying that the lighting state of the traffic lights 290 changes to the second lighting state, the controller 250 may perform restart control such that the host vehicle 201 is driven in a direction 280 where the host vehicle 201 passes through the crosswalk corresponding to the traffic lights 290.

For example, to restart the host vehicle 201, the controller 250 may identify whether at least one condition is met.

As an example, if the lighting state of the traffic lights 290 changes to the second lighting state, the controller 250 may determine whether to perform restart control of the host vehicle 201 based on at least one of whether the user 205 keeps his or her eyes on the road, properties of a driving section, whether a pedestrian crosses, or whether a user confirmation input is received, or any combination thereof.

For example, the controller 250 may identify whether the user 205 keeps his or her eyes on the road using the interior camera 214. The interior camera 214 may receive a vehicle signal (or vehicle information) (e.g., a steering angle and/or a driving speed of the host vehicle 201) about a driving state of the host vehicle 201 from, for example, at least one component (e.g., an ECU, a steering angle sensor (SAS), and/or a speed sensor).

FIG. 3 is a flowchart of an autonomous driving control method.

An autonomous driving control apparatus (e.g., an autonomous driving control apparatus 100 of FIG. 1) may perform operations disclosed in FIG. 3. For example, at least some of components (e.g., at least one of a sensor device 110 of FIG. 1, a driving device 120 of FIG. 1, a memory 130 of FIG. 1, a controller 140 of FIG. 1, an input device 150 of FIG. 1, or a notification device 160, or any combination thereof) included in the autonomous driving control apparatus may be configured to perform the operations of FIG. 3.

Operations in S310 to S370 in an example described below may be sequentially performed, but are not necessarily sequentially performed. For example, an order of the respective operations may be changed, and at least two operations may be performed in parallel. Furthermore, contents, which correspond to or are duplicated with the contents described above in conjunction with FIG. 3, may be briefly described or omitted.

In S310, the autonomous driving control apparatus may control a speed of a host vehicle.

For example, the autonomous driving control apparatus may stop the host vehicle, based on identifying that a lighting state of traffic lights which are present in front of the host vehicle is a first lighting state.

In S320, the autonomous driving control apparatus may maintain stop control.

For example, while the first lighting state is maintained, the autonomous driving control apparatus may maintain stop control for the host vehicle. In other words, the autonomous driving control apparatus may continuously stop the host vehicle while the red light among the traffic lights is being turned on.

In S330, the autonomous driving control apparatus may determine whether colors of the traffic lights are changed.

For example, the autonomous driving control apparatus may identify that the lighting state of the traffic lights changes from the first lighting state to a second lighting state (e.g., a state in which only the green light is turned on).

In S340, the autonomous driving control apparatus may determine whether a driver keeps his or her eyes on the road.

For example, the autonomous driving control apparatus may identify whether the driver keeps his or her eyes on the road. The autonomous driving control apparatus may identify whether the driver keeps his or her eyes on the road as one of conditions required to restart the host vehicle, depending on that the lighting state of the traffic lights changes to the second lighting state.

In S350, the autonomous driving control apparatus may determine (or identify) current road properties and/or whether there is confirmation of the driver.

For example, the autonomous driving control apparatus may identify whether the road on which the host vehicle is currently traveling includes specified properties (or a zone (e.g., a school zone)).

For example, the autonomous driving control apparatus may determine whether a driver configuration input to the at least one input device provided in the host vehicle is received.

In S360, the autonomous driving control apparatus may determine (or identify) whether there is a pedestrian and/or whether there is confirmation of the driver.

For example, the autonomous driving control apparatus may identify whether there is a pedestrian in front of the host vehicle. For example, if the pedestrian is identified within an area with a wider width than the width of a line in which the host vehicle is stopping among areas in front of the host vehicle, the controller 140 may identify that there is the pedestrian.

For example, the autonomous driving control apparatus may determine whether a driver configuration input to the at least one input device provided in the host vehicle is received.

In S370, the autonomous driving control apparatus may restart the host vehicle.

For example, if at least one of whether the user keeps his or her eyes on the road, properties of a driving section, whether the pedestrian crosses, or whether the user confirmation input is received, or any combination thereof meets a specified condition, the autonomous driving control apparatus may perform restart control of the host vehicle. One or more example features about whether the specified condition is met may be replaced with one or more features of the description of FIG. 1, which is described above.

Figure 4:
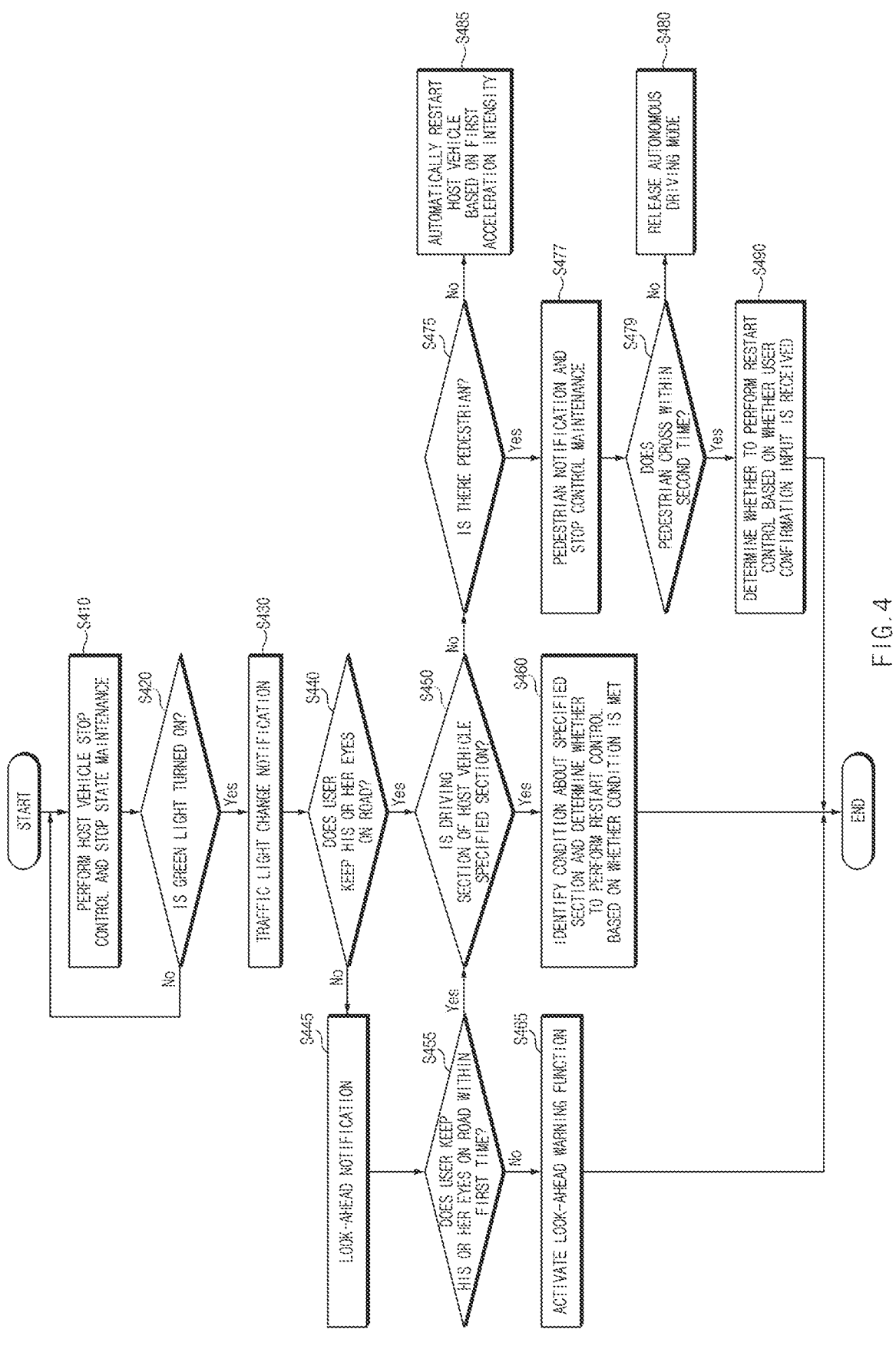
FIG. 4 is a flowchart of an autonomous driving control method.

FIG. 4 is a flowchart of an autonomous driving control method.

An autonomous driving control apparatus (e.g., an autonomous driving control apparatus 100 of FIG. 1) may perform operations disclosed in FIG. 4. For example, at least some of components (e.g., at least one of a sensor device 110 of FIG. 1, a driving device 120 of FIG. 1, a memory 130 of FIG. 1, a controller 140 of FIG. 1, an input device 150 of FIG. 1, or a notification device 160, or any combination thereof) included in the autonomous driving control apparatus may be configured to perform the operations of FIG. 4.

Operations in S410 to S490 in an example below may be sequentially performed, but are not necessarily sequentially performed. For example, an order of the respective operations may be changed, and at least two operations may be performed in parallel. Furthermore, contents, which correspond to or are duplicated with the contents described above in conjunction with FIG. 4, may be briefly described or omitted.

In S410, the autonomous driving control apparatus may perform a host vehicle stop control operation and a stop state maintenance operation.

For example, the autonomous driving control apparatus may stop a host vehicle, based on identifying that a lighting state of traffic lights which are present in front of the host vehicle is a first lighting state.

For example, while the first lighting state is maintained, the autonomous driving control apparatus may maintain stop control for the host vehicle. In other words, the autonomous driving control apparatus may continuously stop the host vehicle while the red light among the traffic lights is being turned on.

In S420, the autonomous driving control apparatus may identify whether the green light among a plurality of lights of the traffic lights is turned on.

For example, if the green light of the traffic lights is turned on, the autonomous driving control apparatus may identify that the lighting state of the traffic lights changes from the first lighting state to a second lighting state.

In S430, the autonomous driving control apparatus may provide a traffic light change notification.

For example, based on identifying that the lighting state of the traffic lights changes to the second lighting state while performing the stop control, the autonomous driving control apparatus may provide a user with information about the lighting state of the traffic lights using a notification device.

In S440, the autonomous driving control apparatus may identify whether the user keeps his or her eyes on the road.

As an example, the autonomous driving control apparatus may continuously monitor whether the user keeps his or her eyes on the road using a sensor device (e.g., an ICC).

For example, if the user keeps his or her eyes on the road (e.g., S440—Yes), the autonomous driving control apparatus may perform S450.

For example, if the user does not keep his or her eyes on the road (e.g., S440—No), the autonomous driving control apparatus may perform S445.

In S445, the autonomous driving control apparatus may provide the user with a look-ahead notification.

For example, the look-ahead notification may include at least one piece of visual and/or audible content for guiding the user to keep his or her eyes on the road.

In S455, the autonomous driving control apparatus may identify whether the user keeps his or her eyes on the road within a first time from a time point when the look-ahead notification is provided.

For example, if the user keeps his or her eyes on the road (e.g., S440—Yes), the autonomous driving control apparatus may perform S450.

For example, if the user does not keep his or her eyes on the road (e.g., S455—No), the autonomous driving control apparatus may perform S465.

In S465, the autonomous driving control apparatus may activate a look-ahead warning function.

For example, the autonomous driving control apparatus may activate the look-ahead warning function including at least one of hazard light ON, a sound output function about look-ahead, or a haptic function, or any combination thereof. The look-ahead warning function may include at least one notification function with higher intensity than the look-ahead notification.

In S450, the autonomous driving control apparatus may identify whether a driving section of the host vehicle corresponds to a specified section.

For example, if the driving section of the host vehicle corresponds to the specified section (e.g., S450—Yes), the autonomous driving control apparatus may perform S460.

For example, if the driving section of the host vehicle does not correspond to the specified section (e.g., S450—No), the autonomous driving control apparatus may perform S475.

In S460, the autonomous driving control apparatus may identify a condition about the specified section and may determine whether to perform restart control based on whether the condition is met.

For example, if it is identified that the driving section is included in the specified section (e.g., a school zone), the autonomous driving control apparatus may determine whether to perform restart control (e.g., by means of an example according to FIG. 6, which will be described below).

In S475, the autonomous driving control apparatus may identify whether there is a pedestrian in front of the host vehicle.

For example, if it is identified that there is the pedestrian in front of the host vehicle (e.g., S475—Yes), the autonomous driving control apparatus may perform S477.

For example, if it is identified that there is no pedestrian in front of the host vehicle (e.g., S475—No), the autonomous driving control apparatus may perform S485.

In S477, the autonomous driving control apparatus may provide the user with a pedestrian notification and may perform stop control maintenance.

For example, the autonomous driving control apparatus may provide the user with a pedestrian notification including information that there is the pedestrian in front of the host vehicle using a notification device and may maintain stop control for the host vehicle.

In S485, the autonomous driving control apparatus may automatically restart the host vehicle based on first acceleration intensity.

For example, the autonomous driving control apparatus may automatically restart the host vehicle based on the first acceleration intensity regardless of whether a user confirmation input is received.

In S479, the autonomous driving control apparatus may identify whether the pedestrian crosses a crosswalk corresponding to traffic lights within a second time.

For example, based on identifying that the pedestrian crosses the crosswalk corresponding to the traffic lights within the second time (e.g., S479—Yes), the autonomous driving control apparatus may perform S490.

For example, based on identifying that the pedestrian does not cross the crosswalk corresponding to the traffic lights within the second time (e.g., S479—No), the autonomous driving control apparatus may perform S480.

In S480, the autonomous driving control apparatus may release (or deactivate) an autonomous driving mode.

In S490, the autonomous driving control apparatus may determine whether to perform restart control based on whether a user confirmation input is received.

Based on identifying that the pedestrian crosses the crosswalk corresponding to the traffic lights within the second time, the autonomous driving control apparatus may determine whether to perform restart control (e.g., by means of an example according to FIG. 5, which will be described below).

Figure 5:
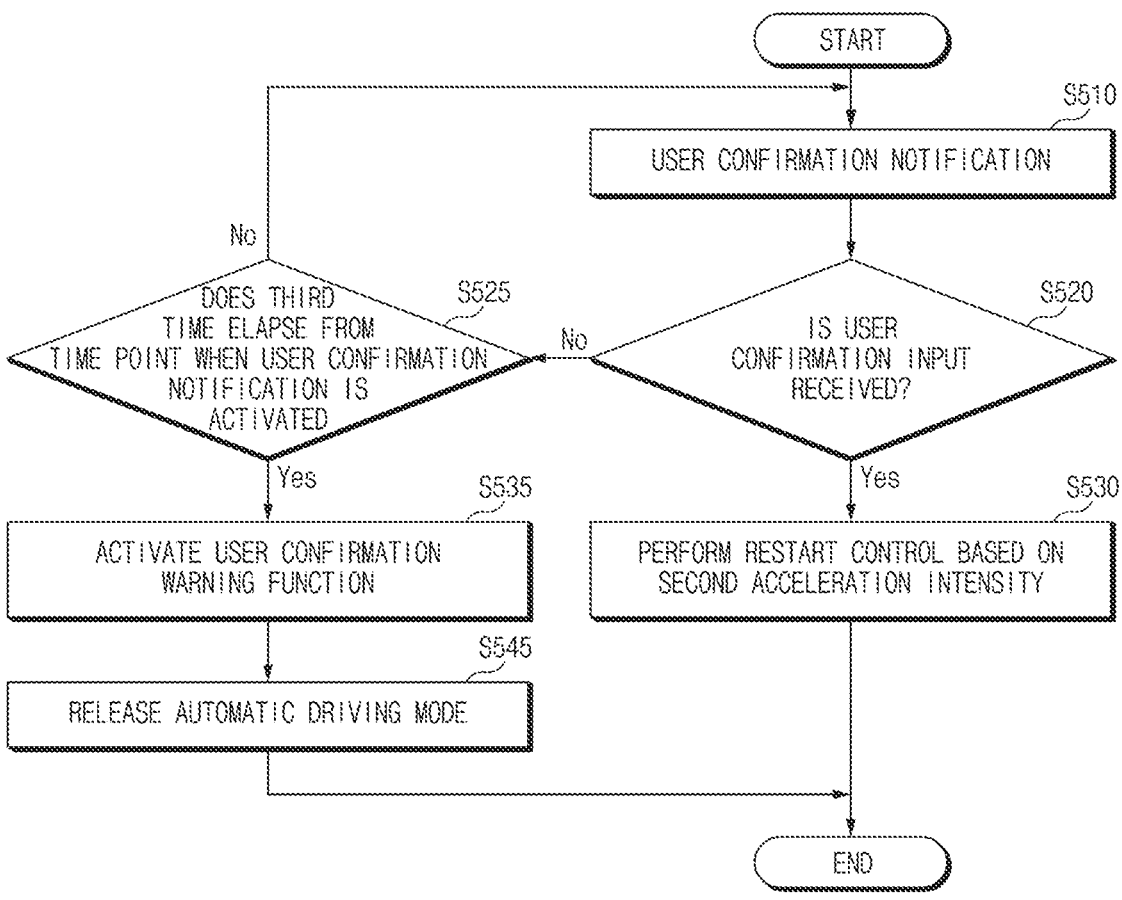
FIG. 5 is a flowchart of an autonomous driving control method.

FIG. 5 is a flowchart of an autonomous driving control method.

An autonomous driving control apparatus (e.g., an autonomous driving control apparatus 100 of FIG. 1) may perform operations disclosed in FIG. 5. For example, at least some of components (e.g., at least one of a sensor device 110 of FIG. 1, a driving device 120 of FIG. 1, a memory 130 of FIG. 1, a controller 140 of FIG. 1, an input device 150 of FIG. 1, or a notification device 160, or any combination thereof) included in the autonomous driving control apparatus may be configured to perform the operations of FIG. 5.

Operations in S510 to S545 in an example below may be sequentially performed, but are not necessarily sequentially performed. For example, an order of the respective operations may be changed, and at least two operations may be performed in parallel. Furthermore, contents, which correspond to or are duplicated with the contents described above in conjunction with FIG. 5, may be briefly described or omitted.

In S510, the autonomous driving control apparatus may provide a user confirmation notification.

For example, based on identifying that the pedestrian crosses the crosswalk within the second time in S479 of FIG. 4, which is described above, the autonomous driving control apparatus may provide the user confirmation notification in S510.

In S520, the autonomous driving control apparatus may identify whether the user confirmation notification is received.

For example, based on the user confirmation input being received (e.g., S520—Yes), the autonomous driving control apparatus may perform S530.

For example, based on the user confirmation input being not received (e.g., S520—No), the autonomous driving control apparatus may perform S525.

In S530, the autonomous driving control apparatus may perform restart control based on second acceleration intensity.

For example, the autonomous driving control apparatus may restart the host vehicle based on the second acceleration intensity less than first acceleration intensity.

In S525, the autonomous driving control apparatus may identify whether a third time elapses from a time point when a user confirmation notification is activated.

For example, if the user confirmation input is received (e.g., S525—Yes), the autonomous driving control apparatus may perform S535.

For example, the autonomous driving control apparatus may activate a user confirmation warning operation. As an example, the user confirmation warning operation may include a notification of a second type (e.g., a feedback or a signal with higher strength than the user confirmation notification).

In S545, the autonomous driving control apparatus may release (or deactivate) an autonomous driving mode.

Figure 6:
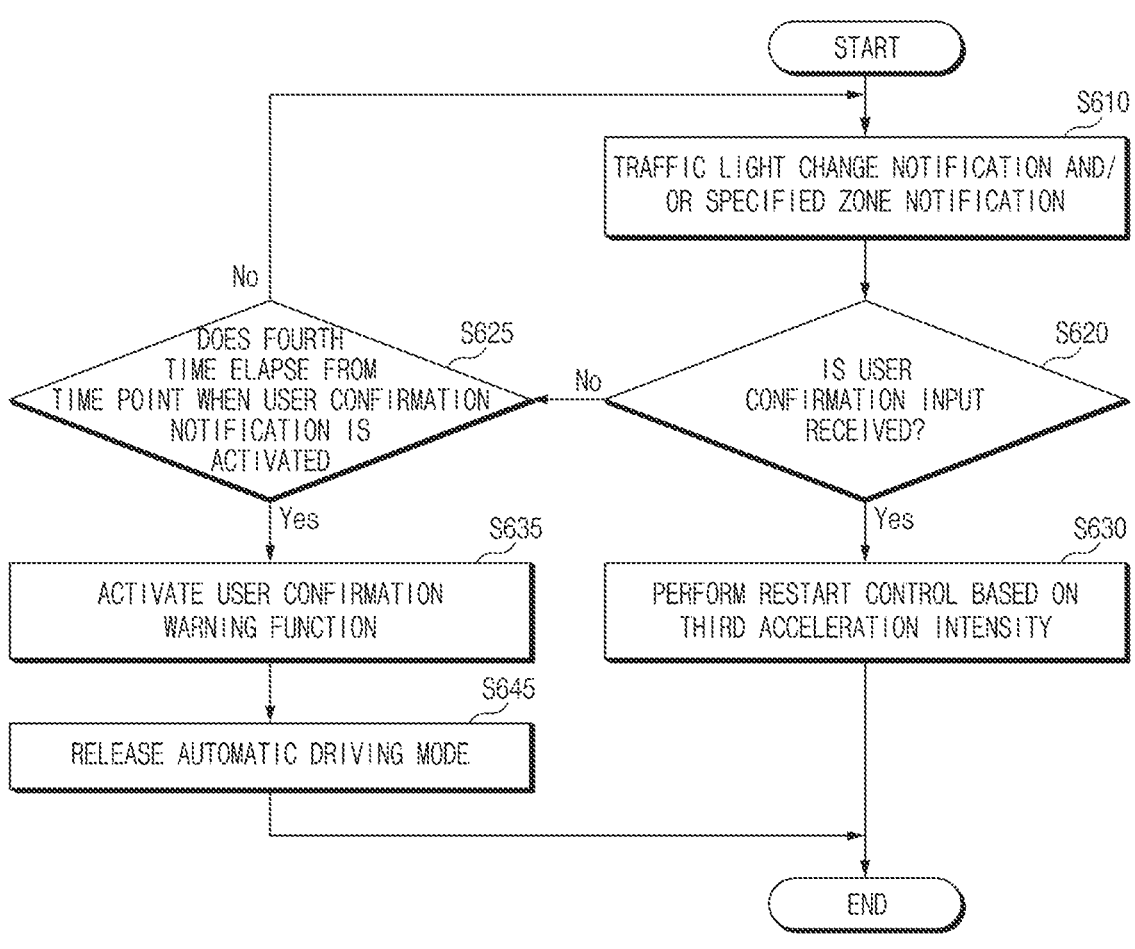
FIG. 6 is a flowchart of an autonomous driving control method.

FIG. 6 is a flowchart of an autonomous driving control method.

An autonomous driving control apparatus (e.g., an autonomous driving control apparatus 100 of FIG. 1) may perform operations disclosed in FIG. 6. For example, at least some of components (e.g., at least one of a sensor device 110 of FIG. 1, a driving device 120 of FIG. 1, a memory 130 of FIG. 1, a controller 140 of FIG. 1, an input device 150 of FIG. 1, or a notification device 160, or any combination thereof) included in the autonomous driving control apparatus may be configured to perform the operations of FIG. 6.

Operations in S610 to S645 in an example below may be sequentially performed, but are not necessarily sequentially performed. For example, an order of the respective operations may be changed, and at least two operations may be performed in parallel. Furthermore, contents, which correspond to or are duplicated with the contents described above in conjunction with FIG. 6, may be briefly described or omitted.

In S610, the autonomous driving control apparatus may provide a user with a traffic light change notification and/or a specified section notification.

For example, based on identifying the driving section in which the host vehicle is traveling is included in the specified section (e.g., the school zone) in S450 of FIG. 4, which is described above, the autonomous driving control apparatus may provide at least one notification in S610.

For example, based on identifying the driving section is included in the school zone, the autonomous driving control apparatus may provide the traffic light change notification and/or the specified zone notification using a notification device. The providing of such a notification function is illustrative, and the notification function provided by the autonomous driving control apparatus is not limited thereto. For example, the autonomous driving control apparatus may provide the user with a first notification about a user confirmation input and a second notification including information that the driving section corresponds to the school zone during a specified time.

In S620, the autonomous driving control apparatus may identify whether the user confirmation notification is received.

For example, the autonomous driving control apparatus may identify whether the user confirmation input is received (e.g., by means of an input device from the user), in response to providing the first notification about the user confirmation input.

For example, if the user confirmation input is received (e.g., S620—Yes), the autonomous driving control apparatus may perform S630.

For example, if the user confirmation input is not received (e.g., S620—No), the autonomous driving control apparatus may perform S625.

In S630, the autonomous driving control apparatus may perform restart control based on third acceleration intensity.

For example, the autonomous driving control apparatus may restart the host vehicle based on the third acceleration intensity less than second acceleration intensity.

In S625, the autonomous driving control apparatus may identify whether a fourth time elapses from a time point when a user confirmation notification is activated.

For example, if the user confirmation input is received (e.g., S625—Yes), the autonomous driving control apparatus may perform S635.

For example, the autonomous driving control apparatus may activate a user confirmation warning operation. As an example, the user confirmation warning operation may include a notification function with higher strength than the user confirmation notification.

In S645, the autonomous driving control apparatus may release (or deactivate) an autonomous driving mode.

Figure 7:
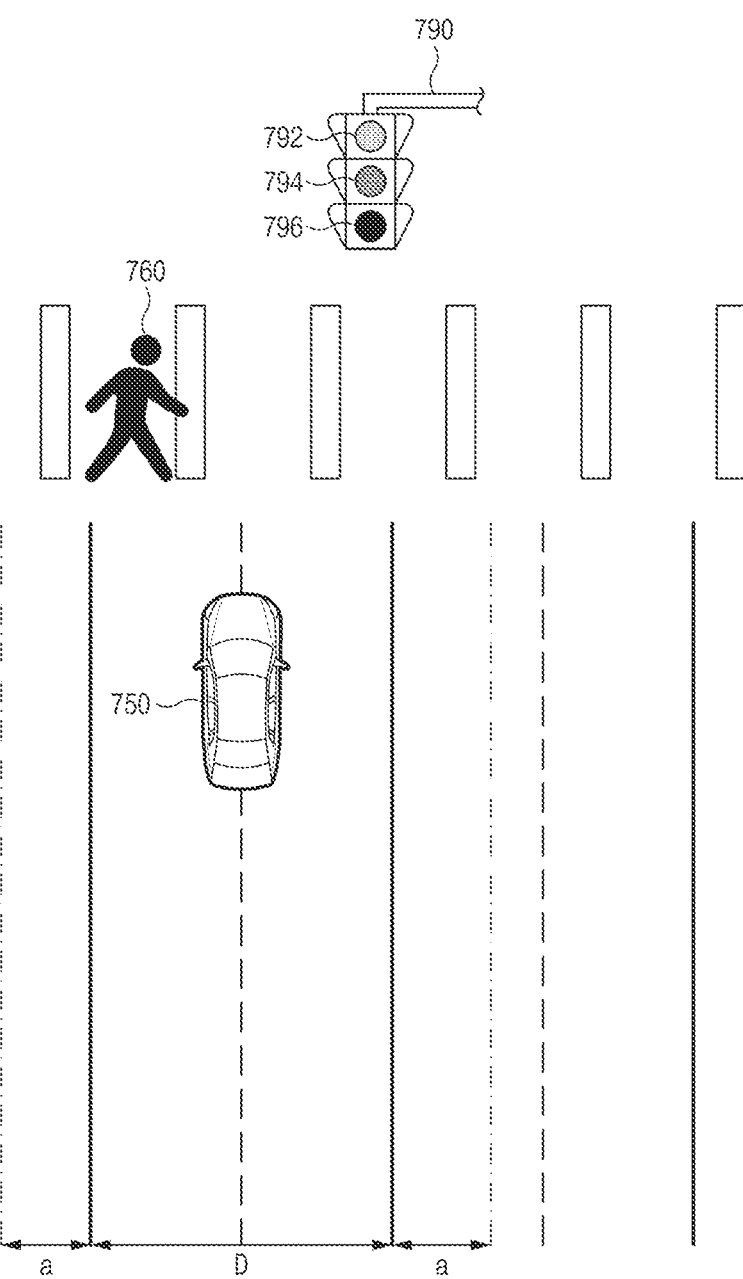
FIG. 7 is an operational conceptual diagram of an autonomous driving control apparatus.

FIG. 7 is an operational conceptual diagram of an autonomous driving control apparatus.

An autonomous driving control apparatus (e.g., an autonomous driving control apparatus 100 of FIG. 1) may drive (or restart) or brake (or stop) a host vehicle 750 depending on a lighting state of traffic lights 790 and/or a position of a pedestrian 760.

For example, if a first light 792 (e.g., a red light) which is being turned on among a plurality of lights (e.g., the first light 792, a second light 794, and a third light 796) included in the traffic lights 790, the autonomous driving control apparatus may perform stop control for the host vehicle 750.

For example, based on identifying that the third light 796 (e.g., a green light) among the plurality of lights included in the traffic lights 790 is turned on and the first light 792 is turned off while performing the stop control for the host vehicle 750, the autonomous driving control apparatus may identify that a lighting state of the traffic lights 790 changes from a first lighting state to a second lighting state.

As an example, if the lighting state of the traffic lights 790 changes to the second lighting state, the autonomous driving control apparatus may identify whether a user keeps his or her eyes on the road. If it is identified that the user keeps his or her eyes on the road, the autonomous driving control apparatus may identify whether there is a pedestrian 760 in front of the host vehicle 750.

As an example, if the pedestrian 760 is identified within an area of a wider range than a width D of a line in which the host vehicle 750 is stopping among areas in front of the host vehicle 750, the autonomous driving control apparatus may identify that there is the pedestrian 760.

As an example, if the pedestrian 760 is identified within a specified area in front of the host vehicle 750, which has a length obtained by adding a specified value a to the width D of the line at each of both sides, the autonomous driving control apparatus may identify that there is the pedestrian 760.

Figure 8:
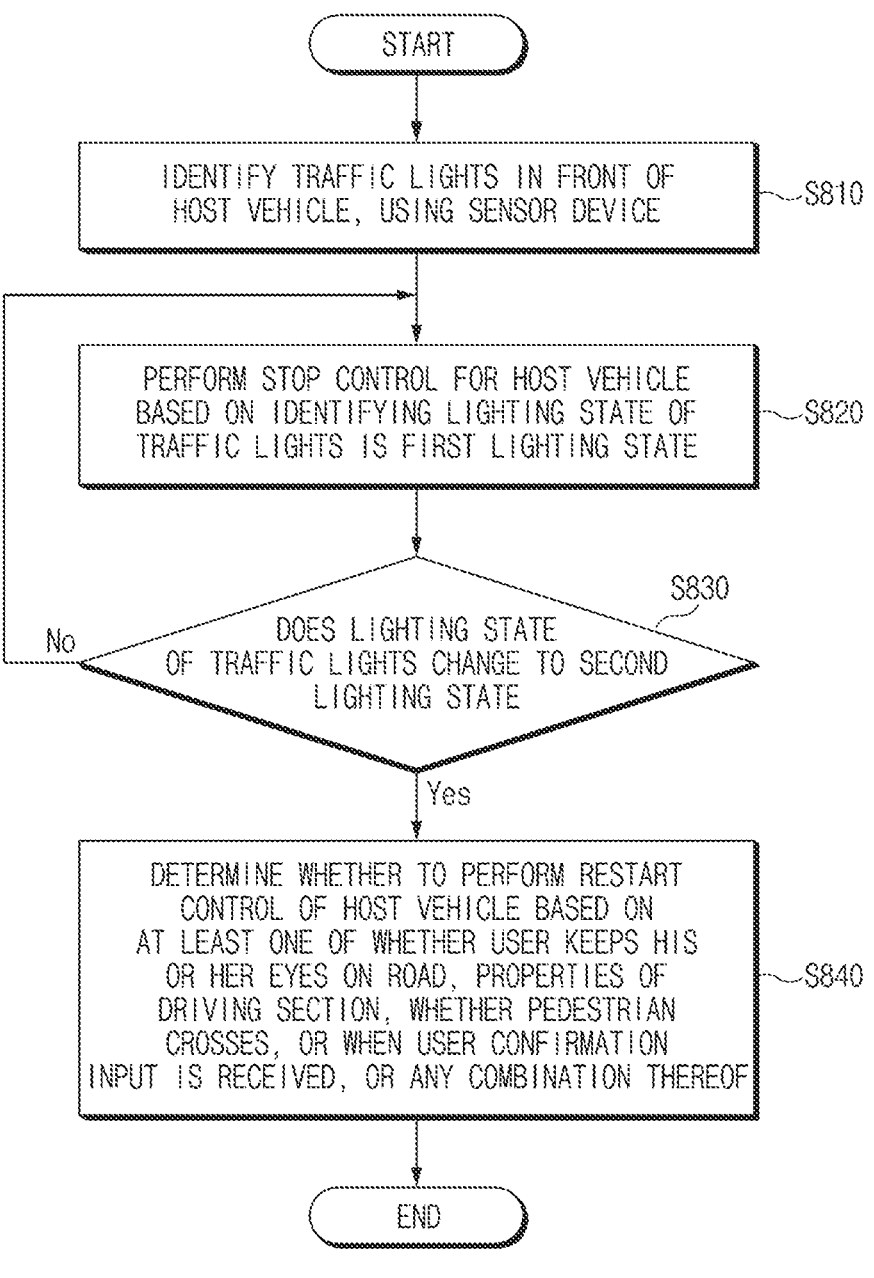
FIG. 8 is a flowchart of an autonomous driving control method.

FIG. 8 is a flowchart of an autonomous driving control method.

An autonomous driving control apparatus (e.g., an autonomous driving control apparatus 100 of FIG. 1) may perform operations disclosed in FIG. 8. For example, at least some of components (e.g., at least one of a sensor device 110 of FIG. 1, a driving device 120 of FIG. 1, a memory 130 of FIG. 1, a controller 140 of FIG. 1, an input device 150 of FIG. 1, or a notification device 160, or any combination thereof) included in the autonomous driving control apparatus may be configured to perform the operations of FIG. 8.

Operations in S810 to S840 in an example below may be sequentially performed, but are not necessarily sequentially performed. For example, an order of the respective operations may be changed, and at least two operations may be performed in parallel. Furthermore, contents, which correspond to or are duplicated with the contents described above in conjunction with FIG. 8, may be briefly described or omitted.

In S810, the autonomous driving control apparatus may identify traffic lights in front of a host vehicle, using a sensor device.

For example, the autonomous driving control apparatus may identify a lighting state of the traffic lights which are present in front of the host vehicle using the sensor device.

For example, the autonomous driving control apparatus may identify a lighting state of the traffic lights (or whether the lighting state changes), using traffic light information received through a communication device.

In S820, the autonomous driving control apparatus may perform stop control for the host vehicle based on identifying that the lighting state of the traffic lights is a first lighting state.

For example, if a third light (e.g., a first light 292 (or a red light) of FIG. 2) among a plurality of lights included in the traffic lights is turned on, the autonomous driving control apparatus may identify that the lighting state of the traffic lights is the first lighting state. In this case, the autonomous driving control apparatus may stop the host vehicle before a stop line (e.g., a stop line 299 of FIG. 2) corresponding to a crosswalk, such that the host vehicle does not pass through the crosswalk corresponding to the traffic lights.

In S830, the autonomous driving control apparatus may identify whether the lighting state of the traffic lights changes to a second lighting state.

For example, if the lighting state of the traffic lights changes from the first lighting state to the second lighting state (e.g., S830—Yes), the autonomous driving control apparatus may perform S840.

For example, if the lighting state of the traffic lights does not change from the first lighting state to the second lighting state (e.g., S830—No), the autonomous driving control apparatus may perform S820.

In S840, the autonomous driving control apparatus may determine whether to perform restart control of the host vehicle based on at least one of whether a user keeps his or her eyes on the road, properties of a driving section, whether a pedestrian crosses, or whether the user confirmation input is received, or any combination thereof.

For example, the autonomous driving control apparatus may determine whether to restart the host vehicle based on whether at least some of the above-mentioned states meet a specified condition. The one or more features about determining whether to perform the restart control of the host vehicle depending on whether the specified condition is met may be replaced with one or more features of the description of FIGS. 1 to 6, which is described above.

According to an aspect of the present disclosure, an autonomous driving control apparatus may include a sensor device, a driving device, a memory storing at least one instruction, and a controller operatively connected with the sensor device and the memory. For example, the at least one instruction may be configured to, when executed by the controller, cause the autonomous driving control apparatus to identify traffic lights in front of a host vehicle, using the sensor device, perform stop control for the host vehicle using the driving device, based on identifying that a lighting state of the traffic lights is a first lighting state, identify that the lighting state of the traffic lights changes from the first lighting state to a second lighting state using the sensor device, and determine whether to perform restart control of the host vehicle based on at least one of whether a user keeps his or her eyes on the road, properties of a driving section, whether a pedestrian crosses, or whether a user confirmation input is received, or any combination thereof.

According to an aspect, the sensor device may include a front view camera and an in cabin camera (ICC). For example, the at least one instruction may be configured to, when executed by the controller, cause the autonomous driving control apparatus to identify the lighting state of the traffic lights, using the front view camera.

According to an aspect, the autonomous driving control apparatus may further include an input device. For example, the at least one instruction may be configured to, when executed by the controller, cause the autonomous driving control apparatus to identify whether the user confirmation input is received through the input device.

According to an aspect, the autonomous driving control apparatus may further include a notification device. For example, the at least one instruction may be configured to, when executed by the controller, cause the autonomous driving control apparatus to provide the user with information about the lighting state of the traffic lights using the notification device, when identifying that the lighting state of the traffic lights changes to the second lighting state while performing the stop control.

According to an aspect, the at least one instruction may be configured to, when executed by the controller, cause the autonomous driving control apparatus to identify whether the user keeps his or her eyes on the road using the sensor device, provide the user with a look-ahead notification using the notification device, when it is identified that the user does not keep his or her eyes on the road, and activate a look-ahead warning function, when identifying that the user does not keep his or her eyes on the road within a first time from a time point when the look-ahead notification is provided using the sensor device.

According to an aspect, the at least one instruction may be configured to, when executed by the controller, cause the autonomous driving control apparatus to activate the look-ahead warning function including at least one of hazard light ON, a sound output function, or a haptic function, or any combination thereof, when identifying that the user does not keep his or her eyes on the road within the first time from the time point when the look-ahead notification is provided.

According to an aspect, the at least one instruction may be configured to, when executed by the controller, cause the autonomous driving control apparatus to identify whether the user keeps his or her eyes on the road using the sensor device, identify the properties of the driving section, when it is identified that the user keeps his or her eyes on the road, identify whether there is a pedestrian in front of the host vehicle using the sensor device, when identifying that the driving section is not included in a specified zone (e.g., a school zone) based on the identified properties, and restart the host vehicle based on first acceleration intensity using the driving device, when it is identified that there is no pedestrian.

According to an aspect, the at least one instruction may be configured to, when executed by the controller, cause the autonomous driving control apparatus to provide the user with a pedestrian notification using the notification device and maintain the stop control for the host vehicle using the driving device, when it is identified that there is the pedestrian, provide the user with a notification about the user confirmation input during a specified time, when identifying that the pedestrian is not identified within a second time from a time point when the pedestrian notification is provided, and restart the host vehicle based on second acceleration intensity less than the first acceleration intensity using the driving device, when receiving the user confirmation input within the specified time from the user.

According to an aspect, the at least one instruction may be configured to, when executed by the controller, cause the autonomous driving control apparatus to activate a warning function including at least one of hazard light ON, a sound output function, or a haptic function, or any combination thereof, when not receiving the user confirmation input within the specified time from the user, and deactivate autonomous driving control for the host vehicle.

According to an aspect, the at least one instruction may be configured to, when executed by the controller, cause the autonomous driving control apparatus to deactivate autonomous driving control for the host vehicle, when the pedestrian is continuously identified within the second time from the time point when the pedestrian notification is provided.

According to an aspect, the at least one instruction may be configured to, when executed by the controller, cause the autonomous driving control apparatus to identify that there is the pedestrian, when the pedestrian is identified within an area with a wider width than a width of a line in which the host vehicle is stopping among areas in front of the host vehicle.

According to an aspect, the at least one instruction may be configured to, when executed by the controller, cause the autonomous driving control apparatus to provide the user with a first notification about the user confirmation input and a second notification including information that the driving section corresponds to the specified zone (e.g., the school zone) during the specified time, when it is identified that the driving section is included in the specified zone (e.g., the school zone) based on the identified properties, and restart the host vehicle based on third acceleration intensity less than the second acceleration intensity using the driving device, when receiving the user confirmation input within the specified time from the user.

According to an aspect, the at least one instruction may be configured to, when executed by the controller, cause the autonomous driving control apparatus to activate a warning function including at least one of hazard light ON, a sound output function about look-ahead, or a haptic function, or any combination thereof, when not receiving the user confirmation input within the specified time from the user, and deactivate autonomous driving control for the host vehicle.

According to an aspect, the autonomous driving control apparatus may further include a communication device. For example, the at least one instruction may be configured to, when executed by the controller, cause the autonomous driving control apparatus to identify whether the lighting state of the traffic lights changes, further using traffic light information received through the communication device.

According to an aspect, the at least one instruction may be configured to, when executed by the controller, cause the autonomous driving control apparatus to reactivate the autonomous driving control, when receiving a resume request input of the autonomous driving control from the user after deactivating the autonomous driving control.

According to another aspect of the present disclosure, an autonomous driving control method may include identifying, by a controller, traffic lights in front of a host vehicle, using a sensor device, performing, by the controller, stop control for the host vehicle using a driving device, based on identifying that a lighting state of the traffic lights is a first lighting state, identifying, by the controller, that the lighting state of the traffic lights changes from the first lighting state to a second lighting state using the sensor device, and determining, by the controller, whether to perform restart control of the host vehicle based on at least one of whether a user keeps his or her eyes on the road, properties of a driving section, whether a pedestrian crosses, or whether a user confirmation input is received, or any combination thereof.

According to an aspect, the autonomous driving control method may further include providing, by the controller, the user with information about the lighting state of the traffic lights using a notification device, when identifying that the lighting state of the traffic lights changes to the second lighting state while performing the stop control, identifying, by the controller, whether the user keeps his or her eyes on the road using the sensor device, providing, by the controller, the user with a look-ahead notification using the notification device, when it is identified that the user does not keep his or her eyes on the road, and activating a look-ahead warning function, when identifying that the user does not keep his or her eyes on the road within a first time from a time point when the look-ahead notification is provided using the sensor device.

According to an aspect, the autonomous driving control method may further include identifying, by the controller, the properties of the driving section, when it is identified that the user keeps his or her eyes on the road, identifying, by the controller, whether there is a pedestrian in front of the host vehicle using the sensor device, when identifying that the driving section is not included in a specified zone (e.g., a school zone) based on the identified properties, and restarting, by the controller, the host vehicle based on first acceleration intensity using the driving device, when it is identified that there is no pedestrian.

According to an aspect, the autonomous driving control method may further include providing, by the controller, the user with a pedestrian notification using the notification device and maintaining, by the controller, the stop control for the host vehicle using the driving device, when it is identified that there is the pedestrian, providing, by the controller, the user with a notification about the user confirmation input during a specified time, when identifying that the pedestrian is not identified within a second time from a time point when the pedestrian notification is provided, and restarting, by the controller, the host vehicle based on second acceleration intensity less than the first acceleration intensity using the driving device, when receiving the user confirmation input within the specified time from the user.

According to an aspect, the autonomous driving control method may further include providing, by the controller, the user with a first notification about the user confirmation input and a second notification including information that the driving section corresponds to the specified zone (e.g., the school zone) during the specified time, when identifying that the driving section is included in the specified zone based on the identified properties, and restarting, by the controller, the host vehicle based on third acceleration intensity less than the second acceleration intensity using the driving device, when receiving the user confirmation input within the specified time from the user.

According to an aspect, the autonomous driving control method may further include activating, by the controller, a warning function including at least one of hazard light ON, a sound output function about look-ahead, or a haptic function, or any combination thereof, when not receiving the user confirmation input within the specified time from the user, and ending, by the controller, autonomous driving control for the host vehicle.

Figure 9:
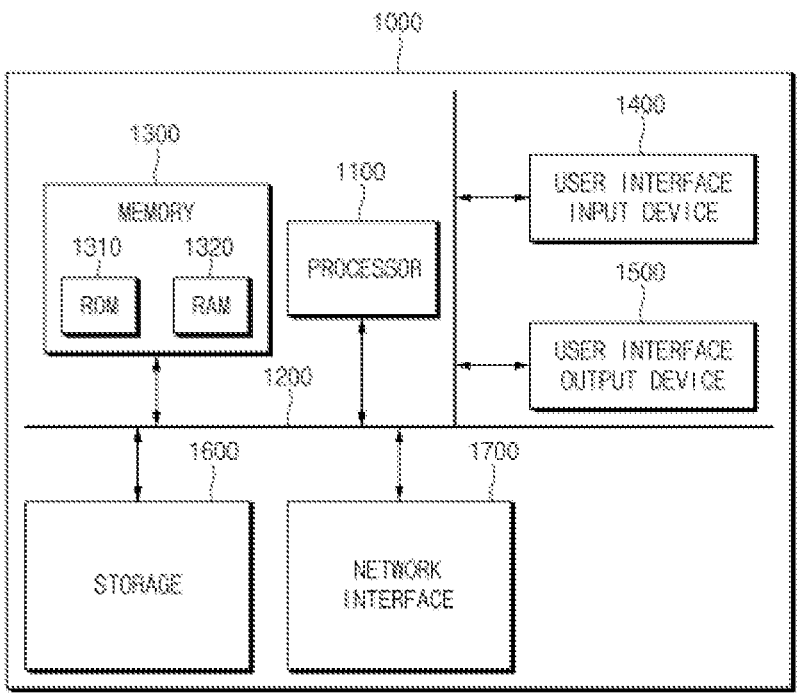
FIG. 9 illustrates a computing system about an autonomous driving control method.

FIG. 9 illustrates a computing system about an autonomous driving control method according to an embodiment of the present disclosure.

Referring to FIG. 9, a computing system 1000 about the autonomous driving control method may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

A description will be given of effects of the autonomous driving control apparatus and the method thereof according to an embodiment of the present disclosure.

According to at least one of embodiments of the present disclosure, the autonomous driving control apparatus may divide a control section for stopping into a general control section, a first section based on first required deceleration and acceleration, a second section based on second required deceleration and acceleration, and a full stop section and may control a host vehicle to perform deceleration control and stop control for the host vehicle, thus providing a function of performing optimal stop control for each section.

Furthermore, according to at least one of embodiments of the present disclosure, the autonomous driving control apparatus may flexibly and smoothly change required deceleration and acceleration and may perform stop control, when a change in driving situation, a relative relationship with a forward vehicle, or the like occurs while performing stop control, thus minimizing a sense of difference provided to the user during stop control.

Furthermore, according to at least one of embodiments of the present disclosure, the autonomous driving control apparatus may independently control stop control without using a separate braking device, thus reducing production cost and manufacturing cost required to produce a device for stop control.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. An apparatus comprising:
a sensor device;
a driving device;
a memory storing at least one instruction; and
a controller operatively connected with the sensor device and the memory,
wherein the at least one instruction is configured to, when executed by the controller, cause the apparatus to:
identify, using the sensor device, a stop indicator in front of a vehicle;
control, based on a status of the stop indicator, the driving device to stop the vehicle;
identify, using the sensor device and while the vehicle is stopped, a condition to control the driving device to restart the vehicle, wherein the condition comprises a change of the status of the stop indicator;
determine, based on the condition, whether to control the driving device to restart the vehicle based on a user confirmation input related to activation of autonomous driving control for the vehicle and based on at least one of:
a tracking status of eyes of a user of the vehicle, or properties of a driving section associated with presence of a pedestrian in proximity to the vehicle; and
deactivate, based on a failure of detecting the user confirmation input, the autonomous driving control for the vehicle.

2. The apparatus of claim 1, wherein the sensor device comprises a front view camera and an in-cabin camera (ICC), and
wherein the at least one instruction is configured to, when executed by the controller, cause the apparatus to:
identify, using the front view camera, a lighting state of traffic lights as at least part of the status of the stop indicator.

3. The apparatus of claim 1, further comprising:
an input device,
wherein the at least one instruction is configured to, when executed by the controller, cause the apparatus to:
identify whether the user confirmation input is received through the input device.

4. The apparatus of claim 1, further comprising:
a notification device,
wherein the at least one instruction is configured to, when executed by the controller, cause the apparatus to:
based on a detection that a lighting state of traffic lights changes to a second lighting state while controlling the driving device to stop the vehicle, output, to the user and using the notification device, information indicating the second lighting state of the traffic lights as at least part of the status of the stop indicator.

5. The apparatus of claim 4, wherein the at least one instruction is configured to, when executed by the controller, cause the apparatus to:

determine, using the sensor device, whether the user keeps the eyes on a road;
based on a determination that the user does not keep the eyes on the road, output, to the user and using the notification device, a look-ahead notification comprising information that informs the user to keep the eyes on the road; and
based on a determination that the user does not keep the eyes on the road within a first time from a time point when the look-ahead notification is output, output a look-ahead warning comprising a signal that causes the user to keep the eyes on the road.

6. The apparatus of claim 5, wherein the at least one instruction is configured to, when executed by the controller, cause the apparatus to:
output the look-ahead warning by activating a look-ahead warning operation, and wherein the look-ahead warning comprises at least one of: an activation of a hazard light, an audible warning sound, or a haptic feedback.

7. The apparatus of claim 4, wherein the at least one instruction is configured to, when executed by the controller, cause the apparatus to:
determine, using the sensor device, whether the user keeps the eyes on a road;
identify the properties of the driving section;
based on an identification that the driving section is not included in a specified zone using the identified properties determine, using the sensor device, whether there is a pedestrian in front of the vehicle; and
based on a determination that there is no pedestrian in front of the vehicle, restart, using the driving device, the vehicle according to first acceleration intensity.

8. The apparatus of claim 7, wherein the at least one instruction is configured to, when executed by the controller, cause the apparatus to:
output, to the user, a pedestrian notification using the notification device;
maintain, based on a determination that there is a pedestrian in front of the vehicle, the vehicle in a stopped state;
based on a determination that a pedestrian is not identified within a second time from a time point when the pedestrian notification is output, output, to the user, a notification indicating the user confirmation input during a specified time; and
based on receiving the user confirmation input within the specified time from the user, restart, using the driving device, the vehicle according to second acceleration intensity less than the first acceleration intensity.

9. The apparatus of claim 8, wherein the at least one instruction is configured to, when executed by the controller, cause the apparatus to:
activate, based on the failure of detecting the user confirmation input within the specified time, a warning operation to output a warning signal, wherein the warning signal comprises at least one of: an activation of a hazard light, an audible warning sound, or a haptic feedback.

10. The apparatus of claim 9, wherein the at least one instruction is configured to, when executed by the controller, cause the apparatus to:
based on receiving a resume request input of the autonomous driving control from the user after deactivating the autonomous driving control, reactivate the autonomous driving control.

11. The apparatus of claim 8, wherein the at least one instruction is configured to, when executed by the controller, cause the apparatus to:

based an identification of one or more pedestrians in front of the vehicle within the second time from the time point when the pedestrian notification is output, deactivate the autonomous driving control for the vehicle.

12. The apparatus of claim 8, wherein the at least one instruction is configured to, when executed by the controller, cause the apparatus to:

based on a determination that the driving section is included in the specified zone using the identified properties, output, to the user, a plurality of notifications comprising:

a first notification about the user confirmation input; and a second notification comprising information that indicates the driving section corresponds to the specified zone during the specified time; and based on receiving the user confirmation input within the specified time from the user, restart, using the driving device, the vehicle according to third acceleration intensity less than the second acceleration intensity.

13. The apparatus of claim 12, wherein the at least one instruction is configured to, when executed by the controller, cause the apparatus to:

activate, based on the failure of detecting the user confirmation input within the specified time, a warning operation to output a warning signal, wherein the warning signal comprises at least one of: an activation of a hazard light, an audible warning sound as a look-ahead indication, or a haptic feedback.

14. The apparatus of claim 7, wherein the at least one instruction is configured to, when executed by the controller, cause the apparatus to:

identify the pedestrian in front of the vehicle, and wherein the pedestrian in front of the vehicle is identified within an area with a wider width than a width of a line in which the vehicle is stopping among areas in front of the vehicle.

15. The apparatus of claim 7, further comprising:

a communication device, wherein the at least one instruction is configured to, when executed by the controller, cause the apparatus to:

determine whether the status of the stop indicator changes by identifying a lighting state of traffic lights changes, using traffic light information received via the communication device.

16. A control method, comprising:

identifying, by a controller and using a sensor device, a stop indicator in front of a vehicle, wherein the stop indicator comprises traffic lights;

controlling, by the controller and based on a status of the stop indicator, a driving device to stop the vehicle, wherein the status of the stop indicator comprises a first lighting state as a lighting state of the traffic lights;

identifying, by the controller and using the sensor device, that the lighting state of the traffic lights changes from the first lighting state to a second lighting state; and determining, by the controller, whether to control the driving device to restart the vehicle based on a user confirmation input related to activation of autonomous driving control for the vehicle and based on at least one of:

a tracking status of eyes of a user of the vehicle, or properties of a driving section associated with presence of a pedestrian in proximity to the vehicle, wherein the autonomous driving control for the vehicle is deactivated based on a failure of detecting the user confirmation input.

17. The control method of claim 16, further comprising:

based on a detection of the lighting state of the traffic lights changes to the second lighting state while controlling the driving device to stop the vehicle, outputting, to the user and using a notification device, information indicating the lighting state of the traffic lights;

determining, by the controller and using the sensor device, whether the user keeps the eyes on a road;

based on a determination that the user does not keep the eyes on the road, outputting, by the controller and to the user, a look-ahead notification comprising information that informs the user to keep the eyes on the road; and based on a determination that the user does not keep the eyes on the road within a first time from a time point when the look-ahead notification is output, outputting a look-ahead warning comprising a signal that causes the user to keep the eyes on the road.

18. The control method of claim 17, further comprising:

based on a determination that the user keeps the eyes on the road, identifying, by the controller, the properties of the driving section;

based on an identification that the driving section is not included in a specified zone using the identified properties, determining, by the controller and using the sensor device, whether there is a pedestrian in front of the vehicle; and based on a determination that there is no pedestrian in front of the vehicle, restarting, by the controller and using the driving device, the vehicle according to first acceleration intensity.

19. The control method of claim 18, further comprising:

outputting, by the controller and to the user, a pedestrian notification using the notification device;

based on a determination that there is a pedestrian in front of the vehicle, maintaining, by the controller, the vehicle in a stopped state;

based on a determination that a pedestrian is not identified within a second time from a time point when the pedestrian notification is output, outputting, by the controller and to the user, a notification indicating the user confirmation input during a specified time; and based on receiving the user confirmation input within the specified time from the user, restarting, by the controller and using the driving device, the vehicle according to second acceleration intensity less than the first acceleration intensity.

20. The control method of claim 19, further comprising:

outputting, by the controller and to the user, a plurality of notifications comprising:

a first notification about the user confirmation input; and a second notification comprising information that indicates the driving section corresponds to the specified zone during the specified time; and based on receiving the user confirmation input within the specified time from the user, restarting, by the controller and using the driving device, the vehicle according to third acceleration intensity less than the second acceleration intensity.

* * * * *